US012676256B2

(12) United States Patent
Nagasaki et al.

(10) Patent No.: US 12,676,256 B2

(45) Date of Patent: Jul. 7, 2026

(54) MAGNETIC MATERIAL, POWDER MAGNETIC CORE, INDUCTOR, AND METHOD OF MANUFACTURING POWDER MAGNETIC CORE

(71) Applicant: Panasonic Intellectual Property Management Co., Ltd., Osaka (JP)

(72) Inventors: Hironori Nagasaki, Osaka (JP); Junichi Kotani, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 554 days.

(21) Appl. No.: 18/547,299

(22) PCT Filed: Mar. 1, 2022

(86) PCT No.: PCT/JP2022/008665

§ 371 (c)(1),
(2) Date: Aug. 21, 2023

(87) PCT Pub. No.: WO2022/186222

PCT Pub. Date: Sep. 9, 2022

(65) Prior Publication Data

US 2024/0127998 A1 Apr. 18, 2024

(30) Foreign Application Priority Data

Mar. 5, 2021 (JP) ................................ 2021-035256

(51) Int. Cl.
*H01F 1/147* (2006.01)
*B22F 1/05* (2022.01)
(Continued)

(52) U.S. Cl.
CPC ............ *H01F 1/14791* (2013.01); *B22F 1/05* (2022.01); *C22C 38/02* (2013.01); *C22C 38/06* (2013.01);
(Continued)

(58) Field of Classification Search
CPC .. H01F 1/14791; H01F 1/14766; H01F 1/147; H01F 27/24; H01F 3/00;
(Continued)

(56) References Cited

U.S. PATENT DOCUMENTS 11,610,710 B2 * 3/2023 Chatani ............... H01F 1/14791
12,251,760 B2 * 3/2025 Kato ....................... H01F 1/153
(Continued)

FOREIGN PATENT DOCUMENTS

JP 2012-009825 A 1/2012
JP 5374537 B2 12/2013
(Continued)

OTHER PUBLICATIONS

International Search Report issued on May 10, 2022 in International Patent Application No. PCT/JP2022/008665, with English translation.

*Primary Examiner* — Hai L Nguyen
(74) *Attorney, Agent, or Firm* — Rimon P.C.

(57) ABSTRACT

A magnetic material includes an Fe—Si—Al-based metal magnetic powder. The Fe—Si—Al-based metal magnetic powder has the following relationships when the Si content is A % by weight and the Al content is B % by weight: 7.2% by weight≤A≤8.1% by weight, 6.0% by weight≤B≤7.5% by weight, and 2A+B≤22.7% by weight.

7 Claims, 9 Drawing Sheets

(a)

| No. | Composition ratio (wt%) | | | Magnetic loss (kW/m³) | | Relative permeability | |
|---|---|---|---|---|---|---|---|
| | Fe | Si | Al | Minimum value | Temperature (°C) | Initial relative permeability | Half value |
| 1 | 84.9 | 7.6 | 7.5 | 370 | 130 | 95 | 2.90 |
| 2 | 85.8 | 7.6 | 6.6 | 460 | 150 | 96 | 3.23 |
| 3 | 86.4 | 7.6 | 6.0 | 480 | 140 | 91 | 3.42 |
| 4 | 85.4 | 8.1 | 6.5 | 340 | 100 | 97 | 2.80 |
| 5 | 86.1 | 7.2 | 6.7 | 440 | 120 | 93 | 3.42 |
| 6 | 87.0 | 5.5 | 7.5 | 680 | 120 | 93 | 3.60 |
| 7 | 87.0 | 6.5 | 6.5 | 610 | 100 | 99 | 3.24 |
| 8 | 86.0 | 6.5 | 7.5 | 770 | 120 | 81 | 3.80 |
| 9 | 87.0 | 7.5 | 5.5 | 800 | FLAT | 98 | 2.94 |
| 10 | 84.7 | 7.5 | 7.8 | 350 | 140 | 106 | 1.95 |
| 11 | 85.2 | 8.0 | 6.8 | 340 | 130 | 98 | 2.33 |
| 12 | 84.7 | 7.0 | 8.3 | 430 | 140 | 102 | 2.08 |
| 13 | 84.7 | 8.2 | 7.1 | 240 | 120 | 94 | 2.60 |
| 14 | 85.9 | 8.3 | 5.8 | 400 | 80 | 115 | 2.07 |
| 15 | 86.0 | 8.5 | 5.5 | 500 | 80 | 102 | 2.68 |
| 16 | 84.0 | 9.5 | 6.5 | 240 | 60 | – | – |
| 17 | 85.0 | 9.1 | 5.9 | 280 | 40 | 101 | – |
| 18 | 84.9 | 9.6 | 5.5 | 470 | 25 | 120 | – |

Half value: DC magnetic field (kA/m) obtained when initial relative permeability decreases by half (b)

(51) Int. Cl.

| | |
|---|---|
| ***C22C 38/02*** | (2006.01) |
| ***C22C 38/06*** | (2006.01) |
| ***H01F 3/08*** | (2006.01) |
| ***H01F 41/02*** | (2006.01) |

(52) U.S. Cl.
CPC ........... *H01F 3/08* (2013.01); *H01F 41/0246* (2013.01); *B22F 2301/35* (2013.01); *B22F 2999/00* (2013.01); *C22C 2202/02* (2013.01)

(58) Field of Classification Search
CPC .......... H01F 3/08; H01F 41/0246; B22F 7/08; B22F 1/05; B22F 1/052; B22F 1/08
USPC ...................... 336/84 M, 177, 212, 218, 221
See application file for complete search history.

(56) References Cited

U.S. PATENT DOCUMENTS

| | | | |
|---|---|---|---|
| 2012/0001710 | A1 | 1/2012 | Wakabayashi et al. |
| 2012/0092106 | A1 | 4/2012 | Takahashi et al. |
| 2012/0229245 | A1 | 9/2012 | Watanabe et al. |
| 2017/0018343 | A1 | 1/2017 | Nishimura et al. |
| 2021/0313111 | A1 | 10/2021 | Kato et al. |

FOREIGN PATENT DOCUMENTS

| | | | |
|---|---|---|---|
| JP | 5522173 | B2 | 6/2014 |
| WO | 2010/103709 | A1 | 9/2010 |
| WO | 2015/079856 | A1 | 6/2015 |
| WO | 2015/137303 | A1 | 9/2015 |
| WO | 2020/040250 | A1 | 2/2020 |

* cited by examiner (a)

| No. | Composition ratio (wt%) | | | Magnetic loss (kW/m³) | | Relative permeability | |
|---|---|---|---|---|---|---|---|
| | Fe | Si | Al | Minimum value | Temperature (°C) | Initial relative permeability | Half value |
| 1 | 84.9 | 7.6 | 7.5 | 370 | 130 | 95 | 2.90 |
| 2 | 85.8 | 7.6 | 6.6 | 460 | 150 | 96 | 3.23 |
| 3 | 86.4 | 7.6 | 6.0 | 480 | 140 | 91 | 3.42 |
| 4 | 85.4 | 8.1 | 6.5 | 340 | 100 | 97 | 2.80 |
| 5 | 86.1 | 7.2 | 6.7 | 440 | 120 | 93 | 3.42 |
| 6 | 87.0 | 5.5 | 7.5 | 680 | 120 | 93 | 3.60 |
| 7 | 87.0 | 6.5 | 6.5 | 610 | 100 | 99 | 3.24 |
| 8 | 86.0 | 6.5 | 7.5 | 770 | 120 | 81 | 3.80 |
| 9 | 87.0 | 7.5 | 5.5 | 800 | FLAT | 98 | 2.94 |
| 10 | 84.7 | 7.5 | 7.8 | 350 | 140 | 106 | 1.95 |
| 11 | 85.2 | 8.0 | 6.8 | 340 | 130 | 98 | 2.33 |
| 12 | 84.7 | 7.0 | 8.3 | 430 | 140 | 102 | 2.08 |
| 13 | 84.7 | 8.2 | 7.1 | 240 | 120 | 94 | 2.60 |
| 14 | 85.9 | 8.3 | 5.8 | 400 | 80 | 115 | 2.07 |
| 15 | 86.0 | 8.5 | 5.5 | 500 | 80 | 102 | 2.68 |
| 16 | 84.0 | 9.5 | 6.5 | 240 | 60 | – | – |
| 17 | 85.0 | 9.1 | 5.9 | 280 | 40 | 101 | – |
| 18 | 84.9 | 9.6 | 5.5 | 470 | 25 | 120 | – |

Half value: DC magnetic field (kA/m) obtained when initial relative permeability decreases by half (b)

(a)

| No. | D10 | D50 | D90 | Particle size distribution | Initial relative permeability |
|---|---|---|---|---|---|
| 21 | 6.5 | 17.0 | 29.9 | 1.37 | 86 |
| 22 | 6.8 | 18.3 | 33.1 | 1.44 | 87 |
| 23 | 7.1 | 19.5 | 35.5 | 1.46 | 88 |
| 24 | 7.3 | 20.4 | 38.2 | 1.52 | 91 |
| 25 | 7.5 | 21.0 | 39.8 | 1.54 | 93 |
| 26 | 7.5 | 22.5 | 44.2 | 1.63 | 96 |
| 27 | 11.2 | 25.3 | 45.2 | 1.35 | 95 |
| 28 | 13.1 | 26.2 | 45.3 | 1.23 | 89 |
| 29 | 17.2 | 28.0 | 46.1 | 1.04 | 84 |
| 30 | 20.1 | 29.8 | 47.2 | 0.90 | 79 |
| 31 | 21.9 | 32.7 | 48.4 | 0.81 | 75 |

Particle size distribution: (D90−D10)/D50

(b)

(a)

| No. | Molding pressure (ton/cm²) | Filling rate (%) | Relative permeability | |
|---|---|---|---|---|
| | | | Initial relative permeability | Half value |
| 41 | 6 | 79.4 | 67 | 3.79 |
| 42 | 7 | 80.3 | 74 | 3.68 |
| 43 | 8 | 81.2 | 81 | 3.48 |
| 44 | 9 | 82.1 | 88 | 3.31 |
| 45 | 10 | 83.0 | 96 | 3.23 |
| 46 | 11 | 83.9 | 103 | 3.04 |
| 47 | 12 | 84.8 | 110 | 2.89 |
| 48 | 13 | 85.7 | 118 | 2.74 |
| 49 | 14 | 86.5 | 125 | 2.58 |

Half value: DC magnetic field (kA/m) obtained when initial relative permeability decreases by half (b)

FIG. 13

| No. | Heating temperature (°C) | Filling rate (%) | Initial relative permeability | Magnetic loss (kW/m³) | Assessment |
|---|---|---|---|---|---|
| 51 | 600 | 81.2 | 82 | 700 | × |
| 52 | 650 | 81.6 | 86 | 600 | ✓ |
| 53 | 700 | 82.1 | 90 | 520 | ✓ |
| 54 | 750 | 83.0 | 95 | 460 | ✓ |
| 55 | 800 | 83.5 | 100 | 550 | ✓ |
| 56 | 850 | 83.8 | 103 | 2500 | × |
| 57 | 900 | 84.0 | 105 | 5500 | × |

MAGNETIC MATERIAL, POWDER MAGNETIC CORE, INDUCTOR, AND METHOD OF MANUFACTURING POWDER MAGNETIC CORE

CROSS-REFERENCE OF RELATED APPLICATIONS

This application is the U.S. National Phase under 35 U.S.C. § 371 of International Patent Application No. PCT/JP2022/008665, filed on Mar. 1, 2022, which in turn claims the benefit of Japanese Patent Application No. 2021-035256, filed on Mar. 5, 2021, the entire disclosures of which Applications are incorporated by reference herein.

TECHNICAL FIELD

The present disclosure relates to a magnetic material, a powder magnetic core including the magnetic material, an inductor including the powder magnetic core, and a method of manufacturing a powder magnetic core.

BACKGROUND ART

A magnetic material including an Fe—Si—Al-based metal powder is known as a material for forming a powder magnetic core of an inductor. Reduction of magnetic loss that leads to an energy loss is required of the magnetic material.

A conventional magnetic material including an Fe—Si—Al-based alloy powder (commonly known as a sendust alloy powder) can reduce hysteresis loss that is one type of magnetic loss. Also, a magnetic material including an Fe—Si—Al-based soft magnetic powder disclosed in Patent Literature (PTL) 1 can reduce magnetic loss in a high-temperature range in which the inductor operates.

CITATION LIST

Patent Literature

[PTL 1] Japanese Patent No. 5374537

SUMMARY OF INVENTION

Technical Problem

With the conventional magnetic material including a sendust alloy powder, however, although the hysteresis loss can be reduced at room temperature, the hysteresis loss increases in the high-temperature range. The magnetic material including a soft magnetic powder disclosed in PTL 1 can reduce magnetic loss in the high-temperature range, but decreases in permeability in situations where large current flows, that is, the direct-current (DC) superimposition characteristics are unfavorable.

In view of the circumstances described above, the present disclosure has an object to provide a magnetic material and so on that inhibit an increase in magnetic loss in the high-temperature range and have excellent DC superimposition characteristics.

Solution to Problem

A magnetic material according to an aspect of the present disclosure is a magnetic material including an Fe—Si—Al-based metal magnetic powder, wherein the Fe—Si—Al-based metal magnetic powder has the following relationships when a Si content is A % by weight and an Al content is B % by weight: 7.2% by weight≤A≤8.1% by weight, 6.0% by weight≤B≤7.5% by weight, and 2A+B≤22.7% by weight.

A powder magnetic core according to an aspect of the present disclosure includes the magnetic material described above.

An inductor according to an aspect of the present disclosure includes: a magnetic core including the powder magnetic core described above; and a coil portion at least partially provided inside the magnetic core.

A method of manufacturing a powder magnetic core according to an aspect of the present disclosure is a method of manufacturing the powder magnetic core described above and includes: molding the powder magnetic core by pressure-molding the magnetic material described above; and heating the powder magnetic core molded, at at least 650° C. and at most 800° C.

Advantageous Effects of Invention

According to the present disclosure, a magnetic material and so on that inhibit an increase in magnetic loss in the high-temperature range and have excellent DC superimposition characteristics can be provided.

BRIEF DESCRIPTION OF DRAWINGS

FIG. 13 is a diagram illustrating a relationship between the heating temperature at which the powder magnetic core is heated and the magnetic characteristics.

DESCRIPTION OF EMBODIMENTS

Hereinafter, embodiments will be specifically described with reference to the drawings.

Note that each of the embodiments described below illustrates one specific example of the present disclosure. The numerical values, shapes, materials, constituent elements, the arrangement and connection of the constituent elements, steps, the processing order of the steps, etc. illustrated in the embodiments below are mere examples, and are not intended to limit the present disclosure. Among the constituent elements in the embodiments below, constituent elements not recited in any one of the independent claims representing the most generic concepts will be described as optional constituent elements.

EMBODIMENT

[Configurations of Magnetic Material and Inductor]

Configurations of a magnetic material and an inductor according to an embodiment will be described with reference to FIG. 1 through FIG. 3.

Figure 1:
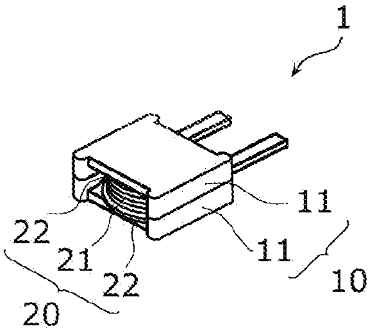
FIG. 1 is a perspective view of an inductor including a magnetic material according to an embodiment.

FIG. 1 is a perspective view of inductor 1 including a magnetic material according to the embodiment. FIG. 2 is an exploded perspective view of inductor 1 illustrated in FIG. 1. FIG. 3 is a diagram schematically illustrating a cross section of the magnetic material.

Figure 2:
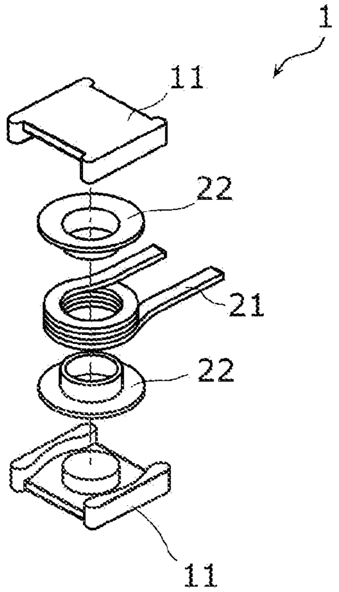
FIG. 2 is an exploded perspective view of the inductor illustrated in FIG. 1.

As illustrated in FIG. 1 and FIG. 2, inductor 1 includes magnetic core 10 and coil portion 20 provided inside magnetic core 10.

Coil portion 20 includes coil conductor 21 and two coil support bodies 22. Part of coil portion 20 is provided inside magnetic core 10, and the remaining part is protruding outside magnetic core 10. Magnetic core 10 is a dust core formed by two powder magnetic cores 11. Powder magnetic cores 11 are each formed as a result of a magnetic material being pressure-molded into a predetermined shape. Magnetic core 10 is attached to coil conductor 21 through coil support bodies 22.

Figure 3:
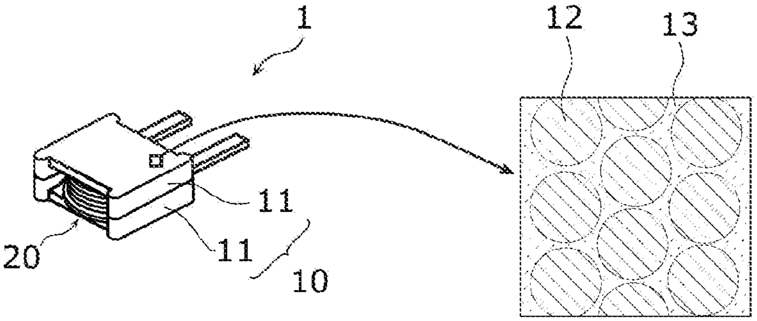
FIG. 3 is a diagram schematically illustrating a cross section of the magnetic material according to the embodiment.

The magnetic material included in powder magnetic cores 11 is a material including Fe—Si—Al-based metal magnetic powder 12 (see FIG. 3). Fe—Si—Al-based metal magnetic powder 12 is hereinafter also referred to as metal magnetic powder 12.

Powder magnetic cores 11 are each formed as a result of a plurality of particles of metal magnetic powder 12 and insulating material 13 being pressure-molded. As illustrated in FIG. 3, insulating material 13 is provided between the particles of metal magnetic powder 12, and the particles of metal magnetic powder 12 are insulated from one another.

Metal magnetic powder 12 according to the present embodiment is a magnetic powder that includes Fe as the main component. The composition ratio of metal magnetic powder 12 has the following relationships when the Si content is A % by weight and the Al content is B % by weight:

(a) 7.2% by weight≤A≤8.1% by weight (b) 6.0% by weight≤B≤7.5% by weight (c) 2A+B≤22.7% by weight, and Fe accounts for the remaining percentage by weight. Note that metal magnetic powder 12 may include inevitable impurities apart from Fe, Si, and Al.

Since the composition ratio of metal magnetic powder 12 has the above relationships (a) through (c), a magnetic material and so on that inhibit an increase in magnetic loss in the high-temperature range and have excellent DC superimposition characteristics can be provided. The reason why the composition ratio of metal magnetic powder 12 is set to the above ranges will be described later.

[Method of Manufacturing Magnetic Material, Powder Magnetic Core, and Inductor]

A method of manufacturing the above-described magnetic material, powder magnetic core, and inductor will be described.

Figure 4:
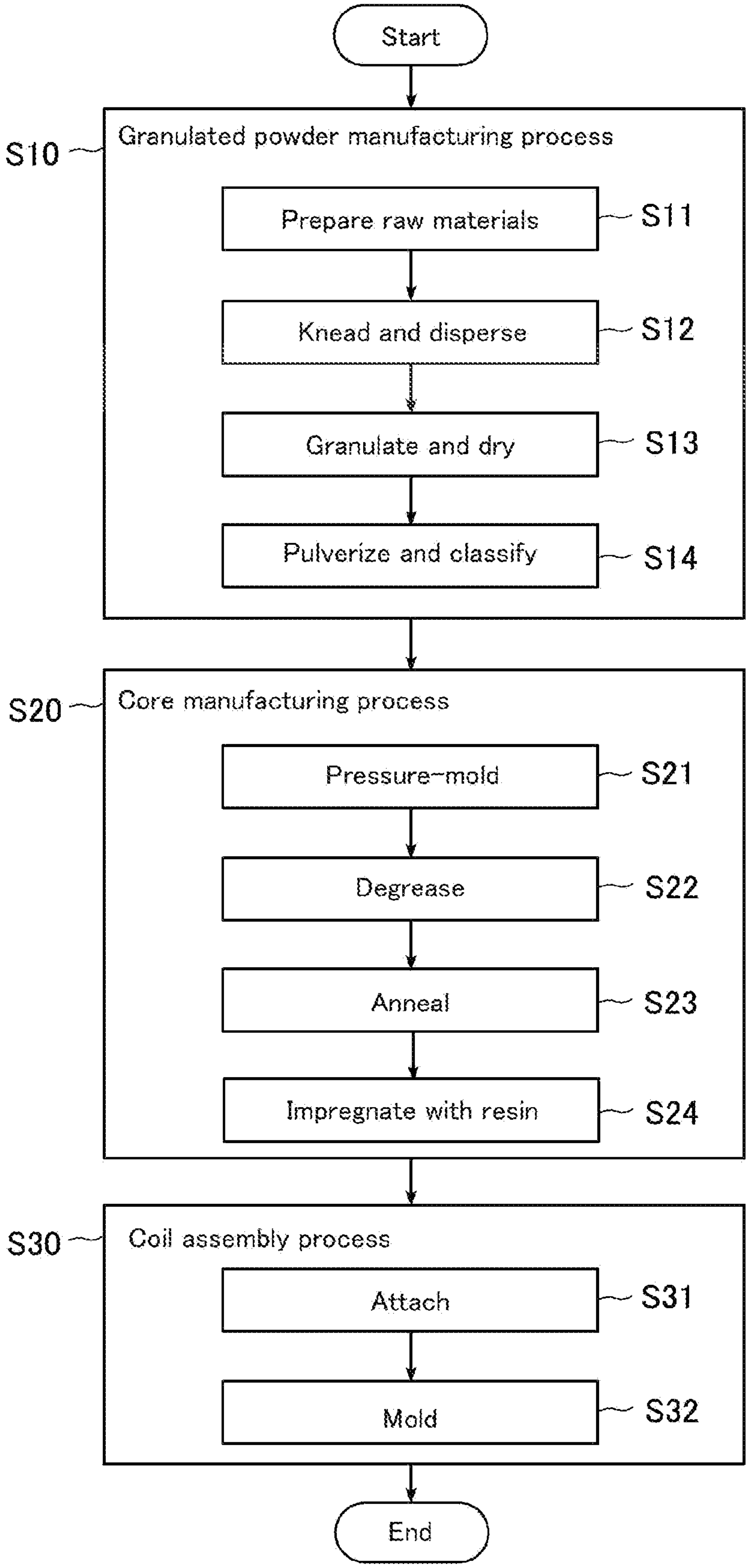
FIG. 4 is a flowchart illustrating manufacturing processes of the magnetic material, a powder magnetic core, and the inductor according to the embodiment.

FIG. 4 is a flowchart illustrating manufacturing processes of the magnetic material, powder magnetic core 11, and inductor 1 according to the embodiment.

The manufacturing process of inductor 1 includes: granulated powder manufacturing process S10 for generating a magnetic material; core manufacturing process S20 for forming powder magnetic core 11; and coil assembly process S30 for producing inductor 1 by assembling powder magnetic cores 11, coil conductor 21, and coil support bodies 22. Hereinafter, each process will be described.

In granulated powder manufacturing process S10, first, raw materials for generating the magnetic material are prepared (step S11). The raw materials for generating the magnetic material are metal magnetic powder 12, an insulating resin material, a binding resin material, and an organic solvent. The particle size distribution of metal magnetic powder 12 is (D90−D10)/D50≥1.0, for example. Metal magnetic powder 12 includes a trace quantity of oxygen. The oxygen content of metal magnetic powder 12 is less than or equal to 500 ppm, for example. The particle size distribution and the oxygen content will be described later.

Next, metal magnetic powder 12, the insulating resin material, the binding resin material, and the organic solvent are kneaded and dispersed (step S12). By doing so, a mixture including metal magnetic powder 12, the insulating resin material, the binding resin material, and the organic solvent is generated. The kneading and dispersion are performed by, for example, placing, in a container, metal magnetic powder 12, the insulating resin material, the binding resin material, and the organic solvent that have been weighed, and mixing and dispersing them in a rotary ball mill.

After metal magnetic powder 12, the insulating resin material, the binding resin material, and the organic solvent are kneaded and dispersed, granulation and drying are performed (step S13). Specifically, the mixture generated in step S12 is heated at a predetermined temperature. The heating removes the organic solvent from the mixture, thereby generating a granulated powder including metal magnetic powder 12, the insulating resin material, and the binding resin material.

Next, the granulated powder produced in step S13 is pulverized to form a powder, and the pulverized granulated powder is classified according to predetermined particle sizes (step S14). Accordingly, a magnetic material made of the granulated powder is generated.

Next, core manufacturing process S20 will be described. In core manufacturing process S20, first, the magnetic material is pressure-molded into a predetermined shape (step S21). Specifically, the magnetic material is placed in a molding die and compressed to produce powder magnetic core 11. At this time, uniaxial molding is performed at a molding pressure of at least 8 ton/cm$^2$ and at most 12 ton/cm$^2$, for example. The filling rate of metal magnetic powder 12 in powder magnetic core 11 is at least 81% and at most 85%, for example.

Next, in an inert gas atmosphere such as $N_2$ gas or in the air, powder magnetic core 11 is heated at a temperature from 200° C. to 450° C. inclusive for degreasing (step S22). With the degreasing, the binding resin material is removed from powder magnetic core 11.

Next, powder magnetic core 11 which has been degreased is annealed (heated) (step S23). Annealing is performed in a temperature range of, for example, at least 650° C. and at most 800° C. in a predetermined partial pressure of oxygen. For example, an atmosphere control electric furnace is used for annealing.

Next, powder magnetic core 11 which has been annealed is impregnated with a resin material (step S24). With the above steps, powder magnetic core 11 including metal magnetic powder 12 and insulating material 13 is formed.

Next, coil assembly process S30 will be described. In coil assembly process S30, magnetic core 10 is attached to coil portion 20 (step S31). Then, magnetic core 10 and coil portion 20 which have been attached are molded using a resin material (step S32). By coil assembly process S30, inductor 1 is completed.

[Composition Ratio of Metal Magnetic Powder]

The composition ratio of metal magnetic powder 12 described above will be described with reference to FIG. 5 through FIG. 9.

Figure 5:
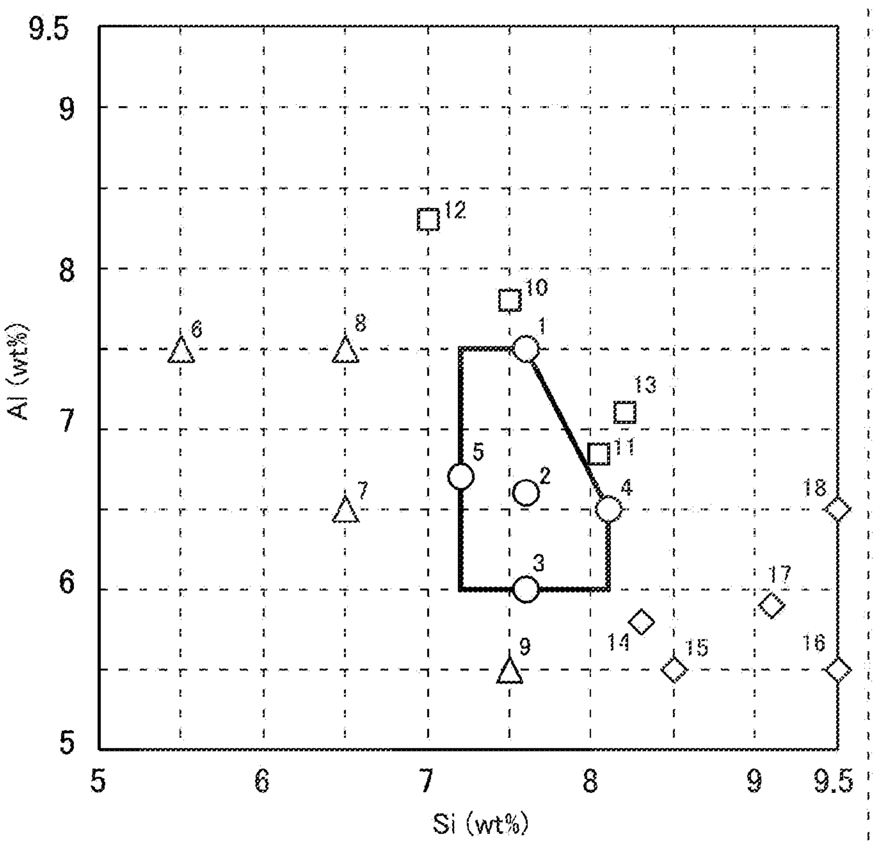
FIG. 5 is a diagram illustrating the composition ratio of an Fe—Si—Al-based metal magnetic powder included in the magnetic material.

FIG. 5 is a diagram illustrating the composition ratio of Fe—Si—Al-based metal magnetic powder 12 included in the magnetic material. Part (a) of FIG. 5 illustrates, for example, the composition ratio, magnetic loss, and relative permeability of metal magnetic powder 12, and also illustrates samples No. 1 through No. 18 that are different in composition ratio of metal magnetic powder 12. Part (b) of FIG. 5 illustrates a graph of a range of the composition ratio of metal magnetic powder 12. The numbers shown in the graph in part (b) of FIG. 5 are sample numbers.

Metal magnetic powder 12 includes Si and Al apart from the main component Fe. The percentage of Si by weight and the percentage of Al by weight are determined within a desirable range by applying the percentage of Si by weight and the percentage of Al to the condition for inhibiting an increase in magnetic loss in the high-temperature range and the condition for achieving excellent DC superimposition characteristics.

First, the condition for inhibiting an increase in magnetic loss in the high-temperature range will be described.

Figure 6:
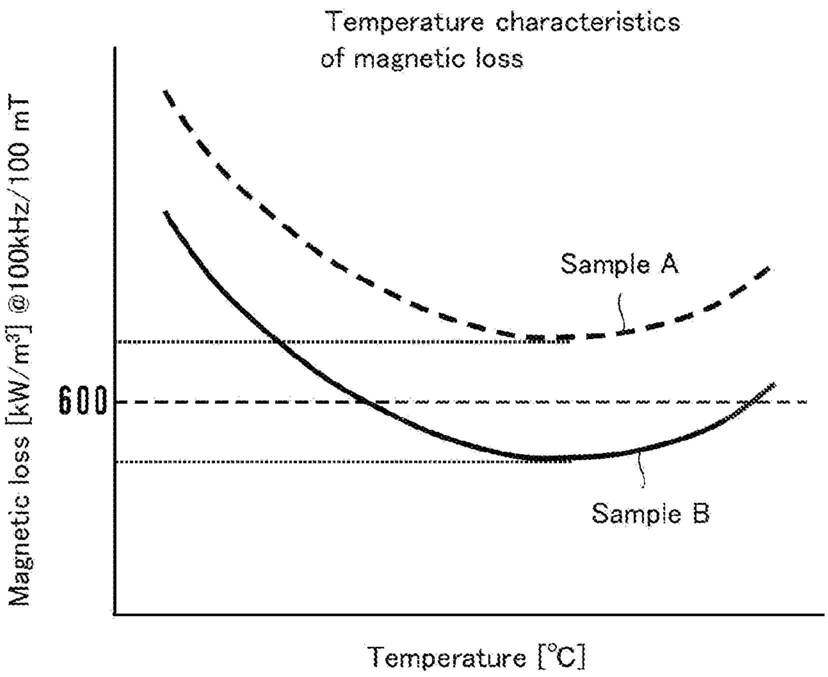
FIG. 6 is a diagram illustrating the minimum value of magnetic loss of the powder magnetic core in the temperature characteristics of the powder magnetic core.
Figure 7:
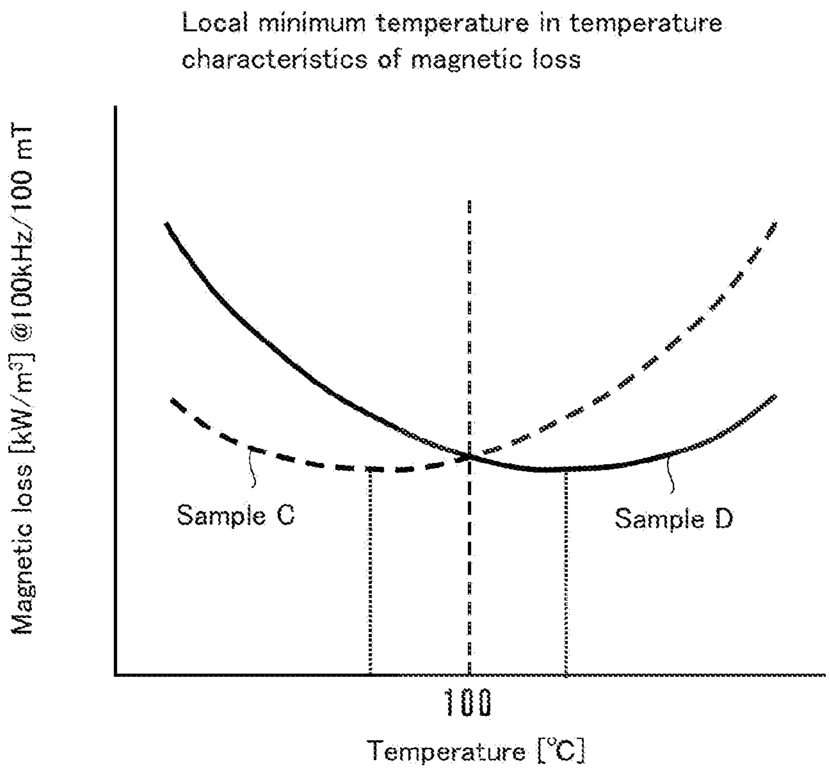
FIG. 7 is a diagram illustrating the local minimum temperature in the temperature characteristics of magnetic loss of the powder magnetic core.

FIG. 6 is a diagram illustrating the minimum value of magnetic loss of the powder magnetic core in the temperature characteristics of the powder magnetic core. FIG. 7 is a diagram illustrating the local minimum temperature in the temperature characteristics of magnetic loss of the powder magnetic core.

As illustrated in FIG. 6 and FIG. 7, the magnetic loss of the powder magnetic core varies with temperature. For example, when the magnetic loss is too high at a predetermined temperature, the powder magnetic core formed using a magnetic material may generate heat anomalously, which could cause an inductor malfunction. In view of this, in the present embodiment, the composition ratio of metal magnetic powder 12 is determined such that the magnetic loss becomes less than or equal to a predetermined threshold at a predetermined temperature during operation of the inductor.

FIG. 6 illustrates an example in which the predetermined threshold of the magnetic loss is 600 kW/m$^3$ (provided that the frequency is 100 kHz and the magnetic flux density is 100 mT). FIG. 7 illustrates an example in which the predetermined temperature is 100° C. The predetermined temperature 100° C. is set based on the heat resistant temperature of the inductor. The predetermined threshold 600 kW/m$^3$ of the magnetic loss is set for maintaining the inductor at the heat resistant temperature or less during operation of the inductor. For example, with sample A in FIG. 6, the minimum value of the magnetic loss is greater than the predetermined threshold, and thus, the powder magnetic core is likely to generate heat anomalously. In contrast, with sample B in FIG. 6, the minimum value of the magnetic loss is less than or equal to the predetermined threshold, and the powder magnetic core is less likely to generate heat anomalously. For example, with sample C in FIG. 7, the temperature is less than 100° C. when the magnetic loss is at minimum, thus not satisfying the heat resistant temperature of the inductor. In contrast, with sample D in FIG. 7, the temperature is greater than or equal to 100° C. when the magnetic loss is at minimum, thus satisfying the heat resistant temperature of the inductor.

As described above, in the present embodiment, the conditions of "the minimum value of the magnetic loss 600 kW/m$^3$" and "the temperature when the magnetic loss is at minimum 100° C." are set as the conditions for inhibiting an increase in the magnetic loss in the high-temperature range. The following describes whether samples No. 1 through No. 18 illustrated in FIG. 5 satisfy the conditions described above.

As illustrated in FIG. 5, samples No. 1 through No. 5 and samples No. 10 through No. 18 satisfy the condition of "the minimum value of the magnetic loss 600 kW/m$^3$", but samples No. 6 through No. 9 do not satisfy the condition of "the minimum value of the magnetic loss 600 kW/m$^3$". Samples No. 1 through No. 13 satisfy the condition of "the temperature when the magnetic loss is at minimum 100° C.", but samples No. 14 through No. 18 do not satisfy the condition of "the temperature when the magnetic loss is at minimum 100° C.".

Next, the conditions for achieving excellent DC superimposition characteristics will be described.

Figure 8:
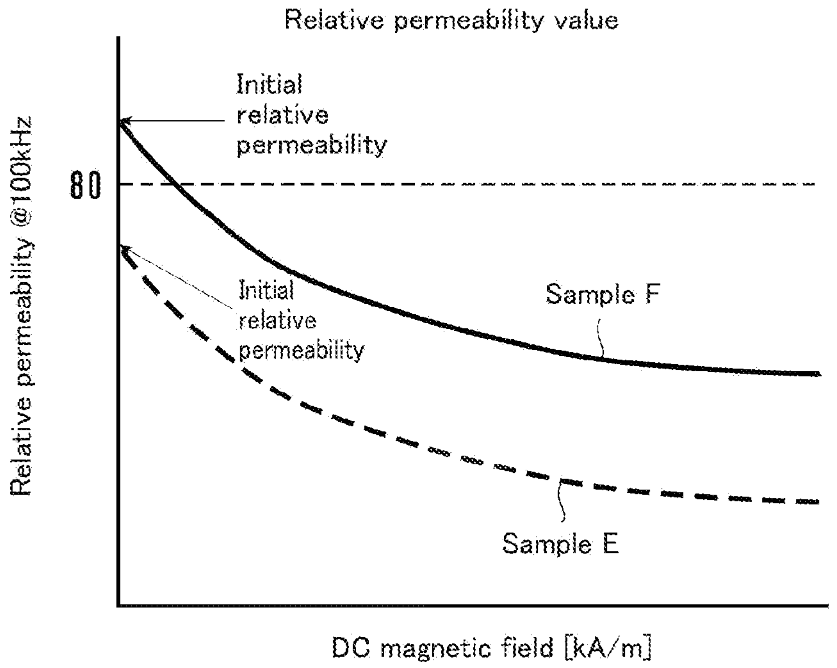
FIG. 8 is a diagram illustrating the initial relative permeability value of the powder magnetic core.
Figure 9:
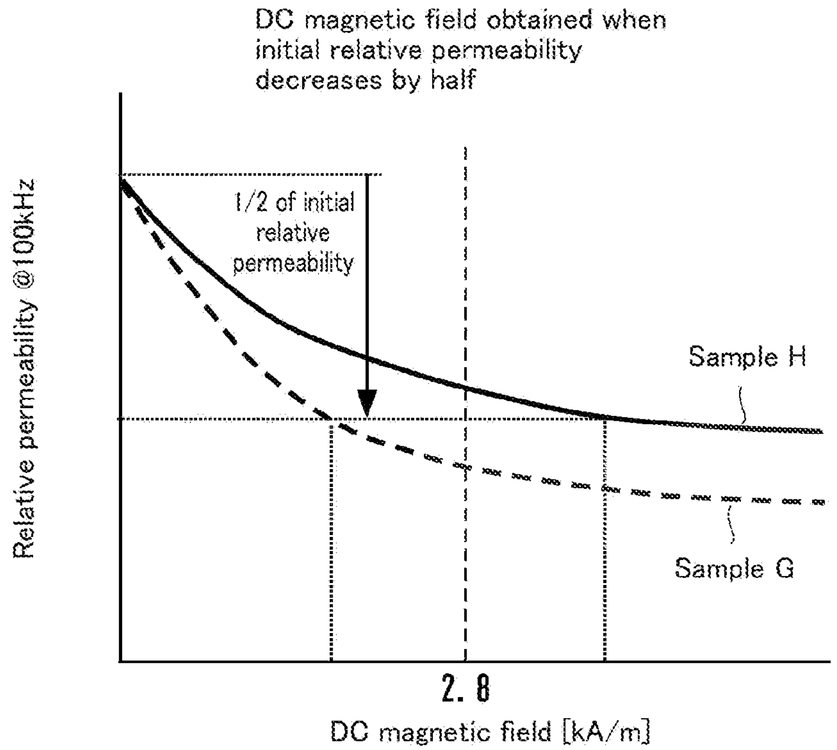
FIG. 9 is a diagram illustrating a relationship between the relative permeability of the powder magnetic core and the DC magnetic field.

FIG. 8 is a diagram illustrating the initial relative permeability value of the powder magnetic core. FIG. 9 is a diagram illustrating a relationship between the relative permeability of the powder magnetic core and the DC magnetic field. Note that the initial relative permeability is the relative permeability when the magnetic field is in the vicinity of 0 (A/m).

As illustrated in FIG. 8 and FIG. 9, the relative permeability of the powder magnetic core varies according to the DC magnetic field. For example, when a decrease in the relative permeability caused by application of the DC magnetic field is too great, that is, when the DC superimposition characteristics are not favorable, magnetic saturation is likely to occur. It is difficult for the inductor in which magnetic saturation has occurred to perform its intended function as an inductor. Furthermore, when the initial relative permeability of the powder magnetic core is too low, the inductance value becomes low. The inductor having a low inductance value cannot exhibit the fundamental performance as an inductor. In view of this, in the present embodiment, the composition ratio of metal magnetic powder 12 is determined such that the initial relative permeability becomes greater than or equal to a predetermined threshold and that the DC magnetic field obtained when the initial relative permeability decreases by half (half value) becomes greater than or equal to a predetermined threshold.

FIG. 8 illustrates an example in which the predetermined threshold of the initial relative permeability is 80 (provided that the frequency is 100 kHz). The predetermined threshold 80 is set based on the heat resistant temperature of the inductor. For example, when the initial relative permeability is low, it is necessary to increase the number of turns of the coil to achieve the inductance value required, which leads to heat generation of the powder magnetic core. In view of this, the predetermined threshold is set for the initial relative permeability so as to avoid exceeding the heat resistant temperature of the inductor.

FIG. 9 illustrates an example in which the predetermined threshold of the DC magnetic field is 2.8 kA/m (provided that the frequency is 100 kHz). The predetermined threshold 2.8 kA/m is set also based on the heat resistant temperature of the inductor. For example, when the DC magnetic field at the time when the initial relative permeability decreases by half (half value) is small, it is necessary to increase the number of turns of the coil to achieve the inductance value required, which leads to heat generation of the powder magnetic core. In view of this, the predetermined threshold is set for the DC magnetic field obtained when the initial relative permeability decreases by half (half value) so as to avoid exceeding the heat resistant temperature of the inductor.

For example, with sample E in FIG. 8, the initial relative permeability is lower than the predetermined threshold, and thus there is a possibility of not satisfying the heat resistant temperature of the inductor. In contrast, with sample F in FIG. 8, the initial relative permeability is higher than or equal to the predetermined threshold, and the heat resistant temperature of the inductor can be satisfied. For example, with sample G in FIG. 9, the DC magnetic field (half value) is lower than the predetermined threshold, and thus there is a possibility of not satisfying the heat resistant temperature of the inductor. In contrast, with sample H in FIG. 9, the DC magnetic field (half value) is higher than or equal to the predetermined threshold, and the heat resistant temperature of the inductor can be satisfied.

As described above, in the present embodiment, the conditions of "the initial relative permeability ≥80" and "the DC magnetic field obtained when the initial relative permeability decreases by half ≥2.8 kA/m" are set as the conditions for achieving excellent DC superimposition characteristics. The following describes whether samples No. 1 through No. 18 illustrated in FIG. 5 satisfy the conditions described above.

As illustrated in FIG. 5, samples No. 1 through No. 18 all satisfy the condition of "the initial relative permeability ≥80". Samples No. 1 through No. 9 satisfy the condition of "the DC magnetic field obtained when the initial relative permeability decreases by half ≥2.8 kA/m", but samples No. 10 through No. 15 do not satisfy the condition of "the DC magnetic field obtained when the initial relative permeability decreases by half ≥2.8 kA/m".

These results show that samples No. 1 through No. 5 are the samples that satisfy all the conditions of "the minimum value of the magnetic loss ≤600 kW/$m^3$", "the temperature when the magnetic loss is at minimum ≥100° C.", "the initial relative permeability ≥80", and "the DC magnetic field obtained when the initial relative permeability decreases by half ≥2.8 kA/m".

Part (b) of FIG. 5 illustrates data in which the percentage of Si by weight and the percentage of Al by weight of samples No. 1 through No. 18 are plotted. The region surrounded by a solid line in part (b) of FIG. 5 is a region including data on samples No. 1 through No. 5 and not including data on samples No. 6 through No. 18. When the Si content is A % by weight and the Al content is B % by weight, the region surrounded by a solid line in part (b) of FIG. 5 is expressed by the following relational expressions: (a) 7.2% by weight≤A≤8.1% by weight, (b) 6.0% by weight≤B≤7.5% by weight, and (c) 2A+B≤22.7% by weight.

Since the composition ratio of metal magnetic powder 12 has the relationships (a) through (c) described above, a magnetic material and so on that inhibit an increase in magnetic loss in the high-temperature range and have excellent DC superimposition characteristics can be provided.

EXAMPLE OF EMBODIMENT

Next, an example of the embodiment will be described.

[Oxygen Content of Metal Magnetic Powder]

Figure 10:
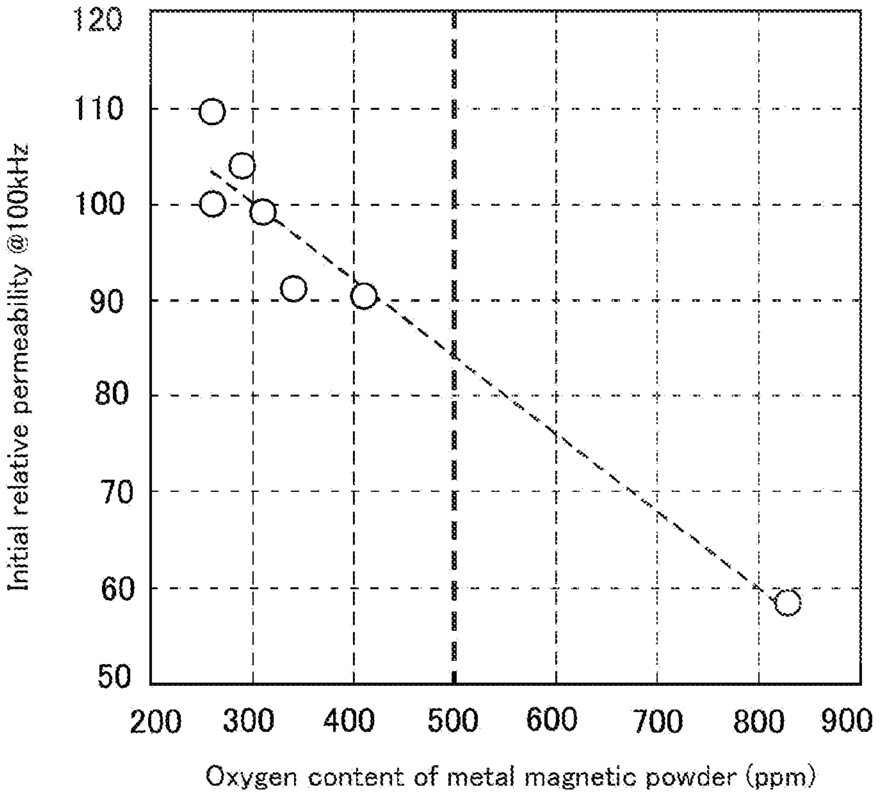
FIG. 10 is a diagram illustrating a relationship between the oxygen content of the Fe—Si—Al-based metal magnetic powder included in the magnetic material and the initial relative permeability.

FIG. 10 is a diagram illustrating a relationship between the oxygen content of Fe—Si—Al-based metal magnetic powder 12 included in the powder magnetic core and the initial relative permeability.

Oxygen included in metal magnetic powder 12 is included when, for example, metal magnetic powder 12 is generated. As illustrated in FIG. 10, the initial relative permeability has a tendency to increase as the oxygen content of metal magnetic powder 12 decreases. Here, when the predetermined threshold of the initial relative permeability is set to 80 (see the description of FIG. 8), the initial relative permeability becomes greater than or equal to the predetermined threshold when the oxygen content is less than or equal to 500 ppm. Therefore, the oxygen content of metal magnetic powder 12 is less than or equal to 500 ppm, for example.

As described above, by setting the oxygen content of metal magnetic powder 12 to less than or equal to 500 ppm, the powder magnetic core formed using the magnetic material can have a high initial relative permeability. Accordingly, a magnetic material which can realize a high inductance value can be provided.

[Particle Size Distribution of Metal Magnetic Powder]

Figure 11:
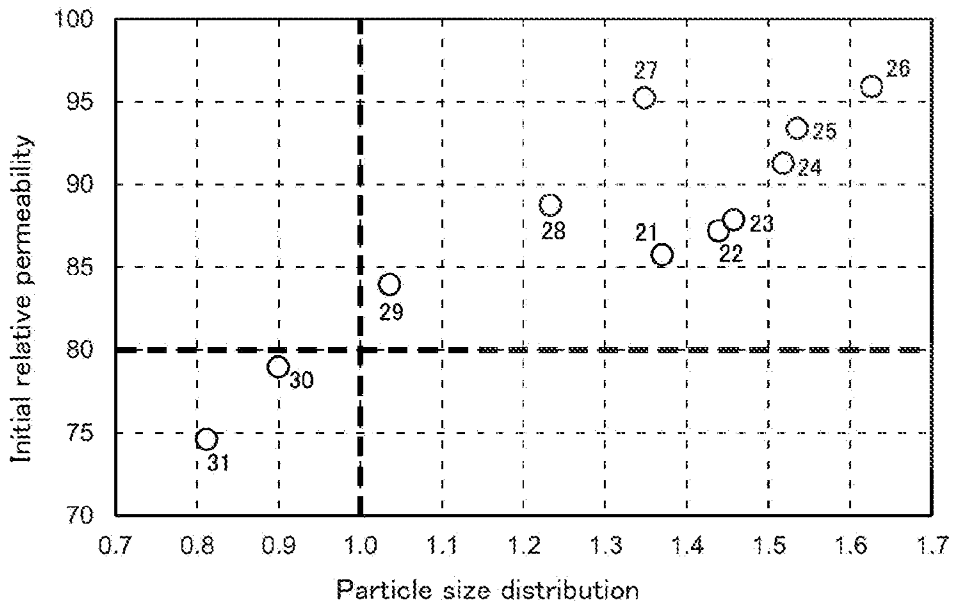
FIG. 11 is a diagram illustrating a relationship between the particle size distribution of the Fe—Si—Al-based metal magnetic powder included in the magnetic material and the initial relative permeability.

FIG. 11 is a diagram illustrating a relationship between the particle size distribution of Fe—Si—Al-based metal magnetic powder 12 included in the magnetic material and the initial relative permeability. Part (a) of FIG. 11 illustrates samples No. 21 through No. 31 prepared by changing the particle size distribution of metal magnetic powder 12. Part (b) of FIG. 11 is a graph illustrating the relationship between the particle size distribution and the initial relative permeability. The numbers shown in the graph in part (b) of FIG. 11 are sample numbers.

The particle size distribution is given by an expression "(D90−D10)/D50". Note that D10, D50, and D90 are particle sizes when the accumulation of frequency is 10%, 50%, and 90%, respectively. The particle size is determined by, for example, a laser diffraction particle size distribution measurement method.

As illustrated in FIG. 11, the initial relative permeability has a tendency to increase as the particle size distribution increases. Here, when the predetermined threshold of the initial relative permeability is set to 80 (see the description of FIG. 8), the samples No. 21 through No. 29 have an initial relative permeability greater than or equal to the predetermined threshold, but the samples No. 30 and No. 31 have an initial relative permeability less than the predetermined threshold. Therefore, the particle size distribution of metal magnetic powder 12 is (D90−D10)/D50≥1.0, for example.

As described above, by setting the particle size distribution of metal magnetic powder 12 to (D90−D10)/D50≥1.0, the powder magnetic core formed using the magnetic material can have a high initial relative permeability. Accordingly, a magnetic material which can realize a high inductance value can be provided.

[Filling Rate of Metal Magnetic Powder in Powder Magnetic Core]

Figure 12:
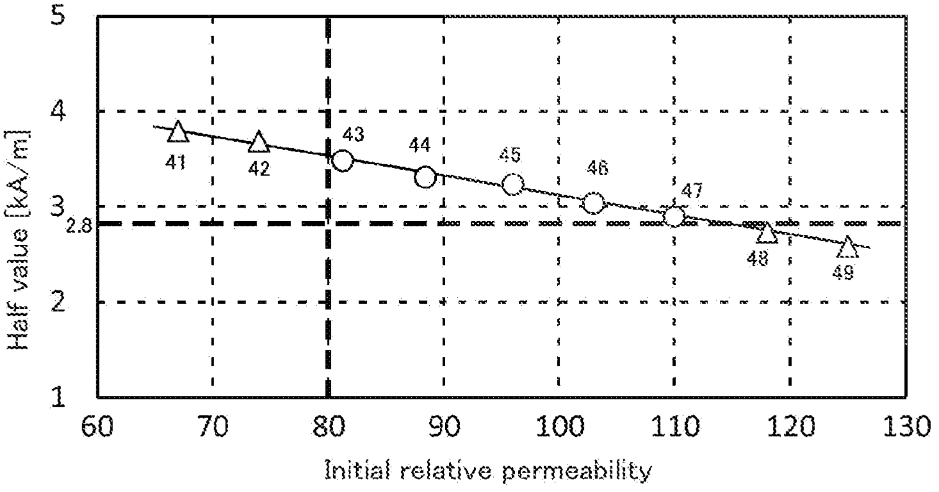
FIG. 12 is a diagram illustrating a relationship between the filling rate of the Fe—Si—Al-based metal magnetic powder in the powder magnetic core and the relative permeability.

FIG. 12 is a diagram illustrating a relationship between the filling rate of Fe—Si—Al-based metal magnetic powder 12 in powder magnetic core 11 and the relative permeability. Note that in this example, the composition ratio of metal magnetic powder 12 is set to Si: 7.6% by weight, Al: 6.6% by weight, and Fe.

Part (a) of FIG. 12 illustrates samples No. 41 through No. 49 prepared by changing the filling rate of metal magnetic powder 12. The filling rate is changed by changing the molding pressure applied when pressure-molding the magnetic material (step S21). Part (b) of FIG. 12 is a graph illustrating a relationship between the initial relative permeability and the half value that vary according to the filling rate. The numbers shown in the graph in part (b) of FIG. 12 are sample numbers.

As illustrated in FIG. 12, the initial relative permeability of the powder magnetic core has a tendency to increase as the filling rate of metal magnetic powder 12 increases. Here, when the predetermined threshold of the initial relative permeability is set to 80 (see the description of FIG. 8), the samples No. 43 through No. 49 have an initial relative permeability greater than or equal to the predetermined threshold, but the samples No. 41 and No. 42 have an initial relative permeability less than the predetermined threshold. That is to say, the initial relative permeability decreases as the filling rate decreases.

Furthermore, when the predetermined threshold of the DC magnetic field obtained when the initial relative permeability decreases by half (half value) is set to 2.8 kA/m (see the description of FIG. 9), the samples No. 41 through No. 47 have a half value greater than or equal to the predetermined threshold, but samples No. 48 and No. 49 have a half value less than the predetermined threshold. That is to say, the half value is small when the filling rate is too high. These results show that the filling rate of metal magnetic powder 12 in powder magnetic core 11 is, for example, at least 81% and at most 85%.

As described above, by setting the filling rate of metal magnetic powder 12 to at least 81% and at most 85%, the powder magnetic core can have a high initial relative permeability, and the DC magnetic field obtained when the initial relative permeability decreases by half (half value) can be high. Accordingly, a magnetic material and so on having excellent DC superimposition characteristics can be provided.

[Heating Temperature of Powder Magnetic Core]

FIG. 13 is a diagram illustrating the heating temperature at which powder magnetic core 11 is heated.

As illustrated in FIG. 13, the initial relative permeability of the powder magnetic core has a tendency to increase as the heating temperature increases and the filling rate increases. Here, when the predetermined threshold of the initial relative permeability is set to 80 (see the description of FIG. 8), the samples No. 51 through No. 57 have an initial relative permeability greater than or equal to the predetermined threshold.

When the predetermined threshold of the magnetic loss is set to 600 $kW/m^3$ (see the description of FIG. 6), the samples No. 52 through No. 55 have magnetic loss less than or equal to the predetermined threshold, but the samples No. 51, No. 56, and No. 57 have magnetic loss higher than the predetermined threshold. The reason for a higher magnetic loss at a low heating temperature is considered to be that the effect of distortion removal is reduced when the heating temperature is too low, resulting in higher hysteresis loss. The reason for a higher magnetic loss at higher heating temperatures is considered to be that the insulation between the powder particles breaks down when the heating temperature is too high, resulting in higher eddy current loss, which is one type of magnetic loss. These results show that the heating temperature of powder magnetic core 11 is, for example, at least 650° C. and at most 800° C.

As described above, by setting the heating temperature of powder magnetic core 11 to at least 650° C. and at most 800° C., powder magnetic core 11 can have a high initial relative permeability and the magnetic loss can be low. Accordingly, powder magnetic core 11 that inhibits an increase in magnetic loss in the high-temperature range can be provided.

SUMMARY

The magnetic material according to the present embodiment is a magnetic material including Fe—Si—Al-based metal magnetic powder 12, wherein Fe—Si—Al-based metal magnetic powder 12 has the following relationships when the Si content is A % by weight and the Al content is B % by weight: 7.2% by weight≤A≤8.1% by weight, 6.0% by weight≤B≤7.5% by weight, and 2A+B≤22.7% by weight.

Since Si and Al included in Fe—Si—Al-based metal magnetic powder 12 have the above relationships, a magnetic material that inhibits an increase in magnetic loss in the high-temperature range and has excellent DC superimposition characteristics can be provided.

Also, the oxygen content of Fe—Si—Al-based metal magnetic powder 12 may be less than or equal to 500 ppm.

As described above, by setting the oxygen content of Fe—Si—Al-based metal magnetic powder 12 to less than or equal to 500 ppm, the powder magnetic core formed using the magnetic material can have a high initial relative permeability. Accordingly, a magnetic material which can realize a high inductance value can be provided.

Also, the particle size distribution of Fe—Si—Al-based metal magnetic powder 12 may be (D90−D10)/D50≥1.0.

As described above, by setting the particle size distribution of metal magnetic powder 12 to (D90−D10)/D50≥1.0, the powder magnetic core formed using the magnetic material can have a high initial relative permeability. Accordingly, a magnetic material which can realize a high inductance value can be provided.

Powder magnetic core 11 according to the present embodiment includes the magnetic material described above.

According to this, powder magnetic core 11 formed using the magnetic material that inhibits an increase in magnetic loss in the high-temperature range and has excellent DC superimposition characteristics can be provided.

The filling rate of Fe—Si—Al-based metal magnetic powder 12 in powder magnetic core 11 may be at least 81% and at most 85%.

As described above, by setting the filling rate of metal magnetic powder 12 to at least 81% and at most 85%, the initial relative permeability can be high, and the DC magnetic field obtained when the initial relative permeability decreases by half can be high. Accordingly, powder magnetic core 11 formed using the magnetic material having excellent DC superimposition characteristics can be provided.

Inductor 1 according to the present embodiment includes: magnetic core 10 including powder magnetic core 11; and coil portion 20 at least partially provided inside magnetic core 10.

According to this configuration, inductor 1 formed using powder magnetic core 11 that inhibits an increase in magnetic loss in the high-temperature range and has excellent DC superimposition characteristics can be provided.

A method of manufacturing a powder magnetic core according to the present embodiment includes: molding powder magnetic core 11 by pressure-molding the magnetic material described above; and heating powder magnetic core 11 molded, at at least 650° C. and at most 800° C.

As described above, by setting the heating temperature of powder magnetic core 11 to at least 650° C. and at most 800° C., the initial relative permeability can be high and the magnetic loss can be low. Accordingly, powder magnetic core 11 that inhibits an increase in magnetic loss in the high-temperature range can be produced.

Other Embodiments, Etc.

Although a magnetic material and so on according to an embodiment of the present disclosure have been described above, the present disclosure is not limited to this embodiment.

Examples of inductors formed using the magnetic material described above include inductance components of, for instance, high-frequency reactors, inductors, and transformers. The present disclosure also encompasses a power supply device including the inductor described above.

The present disclosure is not limited to this embodiment. Various modifications of the present embodiment that are conceivable by those skilled in the art, as well as embodiments resulting from combinations of constituent elements from different embodiments may be included within the scope of one or more aspects, as long as such modifications and embodiments do not depart from the essence of the present disclosure.

INDUSTRIAL APPLICABILITY

A magnetic material according to the present disclosure is applicable to, for example, a material of a magnetic core of a high-frequency inductor and a transformer.

REFERENCE SIGNS LIST

1 inductor
10 magnetic core
11 powder magnetic core
12 metal magnetic powder
13 insulating material
20 coil portion
21 coil conductor
22 coil support body

The invention claimed is:

1. A magnetic material comprising:
an Fe—Si—Al-based metal magnetic powder,
wherein the Fe—Si—Al-based metal magnetic powder has the following relationships when a Si content is A % by weight and an Al content is B % by weight:
7.2% by weight≤A≤8.1% by weight, 6.0% by weight≤B≤7.5% by weight, and 2A+B≤22.7% by weight.

2. The magnetic material according to claim 1,
wherein an oxygen content of the Fe—Si—Al-based metal magnetic powder is less than or equal to 500 ppm.

3. The magnetic material according to claim 1,
wherein a particle size distribution of the Fe—Si—Al-based metal magnetic powder is (D90−D10)/D50≥1.0.

4. A powder magnetic core comprising:
the magnetic material according to claim 1.

5. The powder magnetic core according to claim 4,
wherein a filling rate of the Fe—Si—Al-based metal magnetic powder in the powder magnetic core is at least 81% and at most 85%.

6. An inductor comprising:
a magnetic core including the powder magnetic core according to claim 4; and
a coil portion at least partially provided inside the magnetic core.

7. A method of manufacturing a powder magnetic core, the method comprising:
molding the powder magnetic core by pressure-molding a magnetic material including an Fe—Si—Al-based metal magnetic powder; and
heating the powder magnetic core molded, at least 650° C. and at most 800° C.,
wherein the Fe—Si—Al-based metal magnetic powder has the following relationships when a Si content is A % by weight and an Al content is B % by weight:
7.2% by weight≤A≤8.1% by weight, 6.0% by weight≤B≤7.5% by weight, and 2A+B≤22.7% by weight.

* * * * *